Patented Aug. 9, 1938

2,125,997

UNITED STATES PATENT OFFICE 2,125,997

PROCESS OF TREATING GASES CONTAINING POLYMERIZABLE SUBSTANCES

Alfred Engelhardt, Gonzenheim, near Bad Homburg, Germany, assignor to Carbo-Norit-Union Verwaltungs-Gesellschaft, m. b. H., Frankfort-on-the-Main, Germany, a corporation of Germany No Drawing. Application December 4, 1936, Serial No. 114,290. In Switzerland May 19, 1936

8 Claims. (Cl. 183—4)

This invention relates to a process of treating gases containing resinifying or polymerizing substances, with solid adsorbents.

In treating gases with solid adsorbents, for example, for the production of motor fuels from gases containing hydrocarbons, artificially moulded active carbons have of late been used to an increasing extent. Usually, in selecting the carbon for treating the gases, the criterion adopted has been the adsorptive capacity with respect to a standard mixture of benzol vapour and air.

It has been ascertained that, for the treatment of such gases as contain polymerizing substances, it is not sufficient to judge the carbon by this standard alone, but that it is also of decisive importance to select a carbon which, at the same time, exhibits a minimum susceptibility to resinification and polymerization.

Experiments have now shown that the damage suffered by a carbon through resinification or polymerization depends to a large extent on the apparent density of the moulded carbon, and that carbons with an apparent density less than 0.36, and preferably below 0.34—referred to the dry, ash-free base—suffer only a slight degree of damage through resinification or polymerization. It is advisable that the apparent density should be even lower, and that, so far as is possible, carbons having an apparent density of 0.32 or even lower, should be used.

Hitherto, in contradistinction to the invention, the constant endeavor has been to employ a carbon of good activity per unit of weight and of high apparent density, in order to obtain the highest possible output from a given apparatus. According to the present invention, however, a particularly light, moulded active carbon is employed, and the drawback of reduced capacity of plants of equal size entailed by the use of a more voluminous carbon, is disregarded. This apparent drawback is not only counterbalanced by the longer working life and uniformly continuous activity of such light carbons, but the output capacity of the plane is even substantially increased as the result of these circumstances.

Suitable carbons of low apparent density can be obtained, in a simple manner, by separating a lighter fraction from a given batch of carbon, by a gravity separating treatment, such as winnowing. Carbons sifted in this manner exhibit extreme uniformity in respect of the properties of the individual grains, and are therefore particularly well adapted for the purposes of the present invention.

In carrying out the invention, it is advisable to use carbons having an ash content not exceeding 2%, and preferably below 0.5%, or such as are practically free from ash constituents. When such carbons as are low in, or free from, ash constituents are employed, their apparent density may, on occasion, be disregarded, and an adequate working life obtained even if their apparent density be high.

Having now particularly described and ascertained the nature of my said invention and in what manner the same is to be performed, I declare that what I claim is:

1. Process of treating gases containing polymerizing or resinifying substances which comprises contacting such gases with an artificially molded active carbon having an apparent density of the mass not exceeding 0.36 referred to the dry, ash-free base.

2. Process as defined in claim 1 in which the active carbon has an apparent density not exceeding 0.34.

3. Process as defined in claim 1 in which the active carbon has an apparent density not exceeding 0.32.

4. Process as defined in claim 1 in which the active carbon is the lighter fraction of an active carbon product obtained therefrom by gravity separation.

5. Process as defined in claim 1 in which the active carbon is the lighter fraction of an active carbon product obtained therefrom by winnowing.

6. Process as defined in claim 1 in which the active carbon has an ash content below 2%.

7. Process as defined in claim 1 in which the active carbon has an ash content not exceeding 0.5%.

8. Process as defined in claim 1 in which the active carbon is practically free from ash constituents.

ALFRED ENGELHARDT.